(12) United States Patent
Marggrander

(10) Patent No.: US 7,270,841 B2
(45) Date of Patent: Sep. 18, 2007

(54) PROCESS FOR TREATING THE SURFACE OF FRESH MEAT

(75) Inventor: Kurt Marggrander, Buchen-Bödigheim (DE)

(73) Assignee: Deutsche Gelatine-Fabriken Stoess AG, Eberbach (DE)

( * ) Notice: Subject to any disclaimer, the term of this patent is extended or adjusted under 35 U.S.C. 154(b) by 71 days.

(21) Appl. No.: 10/095,610

(22) Filed: Mar. 12, 2002

(65) Prior Publication Data

US 2002/0136820 A1 Sep. 26, 2002

Related U.S. Application Data

(63) Continuation of application No. PCT/EP00/08829, filed on Sep. 9, 2000.

(30) Foreign Application Priority Data

Sep. 15, 1999 (DE) .................. 199 44 171
Jul. 22, 2000 (DE) .................. 100 35 790

(51) Int. Cl.
 A23L 1/314 (2006.01)
 A23L 1/315 (2006.01)
 A23L 1/325 (2006.01)
(52) U.S. Cl. .................. 426/92; 426/641; 426/643; 426/644
(58) Field of Classification Search .............. 426/92, 426/289, 641, 657, 643, 644
See application file for complete search history.

(56) References Cited

U.S. PATENT DOCUMENTS

| 4,504,502 | A | | 3/1985 | Earle et al. | |
| 5,000,977 | A | * | 3/1991 | Marggrander et al. | .. 426/657 X |
| 5,540,944 | A | | 7/1996 | Reutimann | |
| 5,702,741 | A | | 12/1997 | Reutimann | |
| 5,968,568 | A | * | 10/1999 | Kuraishi et al. | ........ 426/657 X |
| 6,054,154 | A | | 4/2000 | Wang | |

FOREIGN PATENT DOCUMENTS

| EP | 0 277 448 A | 8/1987 |
| EP | 0 547 783 A1 | 6/1993 |
| EP | 0 646 327 A1 | 4/1995 |
| GB | 2 036 535 A | 7/1980 |
| GB | 2 257 891 A1 | 1/1993 |

OTHER PUBLICATIONS

Täufel et al., "Lebensmittel-Lexikon A-K" Dictionary of Foodstuffs A-K, Translated excerpt (1993).
Villegas et al., "Effect of dietary α—tocopheryl acetate supplementation and gelatine dip on the oxidative and colour stability of bacon and pepperoni during frozen storage", *Fleischwirtschaft*, pp. 86-89 (1999).

* cited by examiner

*Primary Examiner*—Arthur L. Corbin
(74) *Attorney, Agent, or Firm*—Leydig, Voit & Mayer, Ltd.

(57) ABSTRACT

The present invention creates a process for treating the surface of fresh meat, in which the meat is treated with a hydrocolloid based on collagen, in particular gelatine, animal glues, collagen, caseins, whey proteins and/or their hydrolysates as well as their mixtures with one another. In particular a weight loss of the meat during storage due to escaping drip is thereby prevented. In the process according to the invention the meat is preferably treated with 0.2 to 1.5 wt % of hydrocolloid, referred to the weight of the meat. It is possible with said process to treat all kinds of meat suitable for human consumption, in particular mammal meat, poultry and fish.

21 Claims, No Drawings

PROCESS FOR TREATING THE SURFACE OF FRESH MEAT

CROSS-REFERENCE TO RELATED APPLICATION

This patent application is a continuation of International Patent Application PCT/EP00/08829, filed Sep. 9, 2000, which designates the U.S.

The present disclosure relates to the subject matter disclosed in German applications No. 199 44 171.5 of Sep. 15, 1999 and No. 100 35 790.3 of Jul. 22, 2000, which are incorporated by reference in their entirety and for all purposes.

BACKGROUND OF THE INVENTION

The present invention relates to a process for treating the surface of fresh meat, the use of hydrocolloids in the treatment of the surface of fresh meat, and fresh meat treated with solid hydrocolloid.

It has been known for a long time in human history to preserve freshly slaughtered meat for a prolonged period, and to guarantee a persistently stable meat quality for human consumption, by means of a brine or by preserving in salt, so-called "pickling". Other well known processes are, for example, smoking and drying.

Said methods of preservation modify the treated meat so such an extent, however, that the latter can no longer be described as fresh meat.

Consumers prefer fresh meat at the present day because storage methods such as, for example, cold storage or freezing followed by thawing have now also become universally available.

The quality of fresh meat for human consumption is influenced significantly during its storage after the slaughter and butchering of the animal by storage parameters such as temperature and humidity, in particular in the case of the aforementioned storage methods.

For maintaining the quality of large pieces of fresh meat during prolonged storage, it is known from Marggrander and Hofmann, Fleischwirtschaft 77, pages 19 to 20, 1997 to spray meat products with a gelatine solution in order to produce a gelatine film.

Said film impedes the access of oxygen to the meat surface, so that oxidation processes, which are the cause of rancidification, are reduced. At the same time said film prevents so-called freezer burn during prolonged cold and frozen storage and reduces weight loss due to drying out of the meat.

Similar subject-matter is known from Villegas et al., Fleischwirtschaft April 1999, pages 86 to 89, where a gelatine coating likewise as a good oxidation barrier is described, so that the meat products treated in this way exhibit a reduced oxidation and only a slight colour deterioration with prolonged storage.

Consumers prefer, particularly with meat packed in portions, an appetising, for the most part rosy, or in the case of poultry and fish, white appearance of the piece of meat, which should also show no residues of blood and still be of firm consistency.

A consumer-subjective quality deterioration nevertheless frequently occurs because during storage, in particular in the case of freezing and thawing processes or during cold storage, meat loses liquid (so-called drip) and water mixed with blood, and the meat surface makes a bad visual impression due to the liquid that has escaped. This results in the final analysis in the consumer being unwilling to purchase such meat, particularly when already portioned, and to the latter therefore often having to be processed as less high grade products, for example pet food.

The problem of drip cannot be mastered with the application of a gelatine film as described above without the external appearance being modified and hence the fresh meat character being forfeited.

A known measure for visually improving the presentation of portioned fresh meat in supermarkets consists in the use of cellular inlays in the packs, which are able to absorb the drip obtained. This results, however, in said cellulosic inlays, because of the blood-containing liquid that has escaped, often having a rather unappetising effect on the consumer.

SUMMARY OF THE INVENTION

The object of the present invention is therefore to propose a process for treating the surface of fresh meat in which the production of drip during storage may as far as possible be prevented and not, as with the use of cellular inlays, simply be absorbed.

Said object is achieved in the case of the process described in the preamble by the fact that the meat is treated with solid hydrocolloid.

It is understood by treatment of meat with solid hydrocolloid that the solid hydrocolloid is applied to the surface of the meat distributed as uniformly as possibly, by means of methods known per se, such as for example dusting.

As a rule even fairly small amounts of hydrocolloid are sufficient to achieve the effect according to the invention. As a result of the treatment of the fresh meat with solid hydrocolloid according to the invention, neither the visual appearance nor the tactile property of the product changes to a significant extent, so that the consumer is for practical purposes unable to detect a difference between fresh meat treated and not treated according to the invention.

Astonishingly, the treatment of meat with solid hydrocolloid, in which the meat may be present in particular in portioned pieces or even as minced meat, makes it possible for the formation of drip to be strongly reduced, or even be largely prevented, during the storage, for example cold storage or freezing and thawing, of the meat, without the appearance of the fresh meat thereby being modified.

The reduction of the drip loss is accompanied by a minimisation of the loss to the original weight, which makes it possible to make a reduction in the conventionally required additional original weight of the meat, whereby the original weight printed on the package label is complied with even with prolonged storage.

A reduction in the additional original weight of fresh meat of up to 3 to 5 wt %, referred to the net original weight of the meat, is possible, so that an economically not insignificant additional profit is achieved by a meat processing and/or meat packing plant due to the saving on original weight.

The treatment with solid hydrocolloid also makes it possible to dispense with the inclusion of a cellulosic fabric, whereby costs may also be cut and the unappetising appearance of the cellulosic fabric contaminated with blood-containing meat juice may be avoided, so that, for example, packed meat is presented to the consumer in a more appetising manner.

In addition, the meat retains its natural fresh meat colour due to the treatment with solid hydrocolloid and thus also keeps its appetising appearance.

The process according to the invention has particular advantages in the case of portioned meat. It is naturally also possible for large pieces of meat, fish or poultry to be processed in this way and thus preserved for a prolonged period. However, considering the main groups of customers, namely consumers in supermarkets or butcher's shops who purchase meat for their daily requirements, the main focus of the use of the process according to the invention will lie in the treatment of portioned products. This also includes already prepared minced meat.

With advantage the treatment is carried out with finely divided hydra colloid. Finely divided is understood to mean granules or powder with a mean grain size which is significantly less than 1 mm. The finely divided hydrocolloid permits the use of smaller amounts of hydrocolloid and the covering of a larger surface of the meat. In addition, the active surface of the hydrocolloids is increased in this way. Furthermore the taste of the meat is affected by the hydrocolloid to a lesser extent when the hydrocolloid is finely divided.

Particularly pronounced effects are obtained with spray-dried hydrocolloid material.

A small grain size of the hydrocolloid also permits the simple treatment of small-sized or minced meat.

It is of particular advantage if the hydrocolloid is present in powder form. Since hydrocolloids are produced in powder form in all the methods for obtaining them known to date, the latter may be used without an additional cost- and process-intensive further processing step.

The mean particle size of the hydrocolloid powder for preference amounts to <0.2 mm here, more preferably 0.05 mm to 0.15 mm.

Preferably the hydrocolloid is a hydrocolloid based on collagen, in particular gelatine, animal glues, collagen, caseins, whey proteins and/or their hydrolysates and their mixtures with one another. It is thus ensured that the hydrocolloids are standard hydrocolloids which are easy to prepare and available at low cost and hence do not entail any major additional costs for the meat processing plant.

Preferably the meat is treated with 0.2 to 1.5 wt % of hydrocolloid. A satisfactory binding of the meat juice is already achieved with 0.2 wt % of hydrocolloid. More than 1.5 wt % is certainly also possible, but this is less practicable on economic grounds because of the additional consumption of hydrocolloid, and the taste of the meat can be slightly adulterated by the disproportionate addition of hydrocolloid.

In a further preferred embodiment the meat is treated with 0.5 to 0.9 wt % of hydrocolloid, referred to the weight of the meat. Within said range an optimum balance is achieved between the binding of the meat juice and an economically justifiable amount of hydrocolloid.

The process according to the invention may be applied to: mammalian meat, for example beef, pork, lamb or game. Said process permits the treatment against drip loss of all edible types of meat from mammals, which may thus be supplied for human consumption in an appetising manner.

It is preferable in this case that the hydrocolloid is prepared from animal collagen obtained from mammals. It is thus ensured that a possible distortion of the meat taste, arising from hydrocolloids from non-meat raw materials, does not occur.

In a further advantageous embodiment the meat is poultry meat. All types of poultry suitable for human consumption may be treated against drip loss with the process according to the invention.

The skin of poultry in particular often acquires an unappetising appearance through the escape of drip when stored for a prolonged period. The meat often has a glassy or watery look to the consumer. Said disadvantages are overcome almost completely by the process according to the invention.

In each case a hydrocolloid with as weak a taste of its own as possible will preferably be selected. Other collagens which have a stronger taste of their own may naturally also be used in this case, but this can lead in certain circumstances to a distortion of the poultry taste, so that in this case high-purity collagen is preferred because of the sensory properties of the product.

In a further advantageous embodiment the meat in the process according to the invention is fish flesh. Fish is often frozen by prolonged storage and subsequently loses a large amount of water during the thawing process and therefore requires a more intensive treatment than the aforementioned types of meat prior to consumption. All types of fish suitable for human consumption may be treated with the process according to the invention and in particular the problem of the extremely high escape of drip encountered above all with fish may be prevented almost completely by a subsequent intensive treatment.

Preferably a hydrocolloid with as weak a taste of its own as possible is selected in this case. Since fish has a pronounced taste of its own, it is preferable in this case, in view of its sensory properties, to use high-purity collagen in the process according to the invention. Other hydrocolloids with a less neutral taste may naturally also be selected, but in this case a distortion of the fish taste is possible.

However, the use of hydrocolloids that are obtained from vegetable raw materials is also possible with all of the aforementioned types of meat, since the latter frequently have a more neutral taste than, for example, collagen obtained from poultry, animals or fish. The use of a mixture of hydrocolloids that are based on animal and vegetable raw materials is also possible. The mixture ratio is selectable at will here. It will be influenced only by the sensory properties which may need to be set, for example widespread retention of the typical meat product taste, and will vary individually according to meat category and hydrocolloid.

The use of hydrocolloids prepared from animal or vegetable starting products for the treatment of the surface permits drip losses in fresh meat to be avoided in an advantageous manner. As regards taste optimisation, the hydrocolloid may be adjusted to the corresponding meat by the choice of the starting product, although mixtures of different hydrocolloids, for example of a vegetable and animal nature, are also provided according to the intended use.

DETAILED DESCRIPTION OF THE INVENTION

The following embodiments serve for further explanation of the process according to the invention.

The percentages by weight always refer to the total net original weight of the fresh meat.

EXAMPLE 1

Beef

A portioned beef steak exhibits with conventional cold storage at +2 to +4° C. for 5 days a drip loss of 5.7 wt %.

A portioned beef steak is treated by dusting with 0.6 wt % of spray-dried gelatine powder (mean particle size <0.2 mm; 90 wt % with a particle size in the range from 0.05 to 0.15 mm). The drip loss measured after cold storage at a temperature of +2 to +4° C. for 5 days comes to 0.3 wt %.

This corresponds to an additional increase in usable fresh meat of 5.4 wt %.

EXAMPLE 2

Beef

Beef goulash exhibits with cold storage at +2 to +4° C. for 5 days a drip loss of 5.4 wt %.

The same amount of beef goulash was treated by the process according to the invention by the addition of 0.5 wt % of spray-dried gelatine powder (as Example 1), wherein with cold storage at +2 to +4° C. for 5 days the drip loss comes to 0.8 wt %.

This corresponds to an additional increase in usable fresh meat of 4.6 wt %.

EXAMPLE 3

Pork

A portioned pork escalope exhibits with conventional cold storage at +2 to +4° C. for 5 days a drip loss of 4.3 wt %.

A portioned pork escalope was dusted according to the process according to the invention with 0.6 wt % of spray-dried gelatine powder (as Example 1). After cold storage at +2 to +4° C. for 5 days a drip loss of 0.1 wt % is obtained.

This corresponds to an additional increase in usable fresh meat of 4.2 wt %.

EXAMPLE 4

Poultry

A portioned turkey escalope exhibits with conventional cold storage at +2 to +4° C. for 5 days a drip loss of 3.0 wt %.

A turkey escalope treated according to the process according to the invention by dusting with 0.6 wt % of a spray-dried gelatine powder (as in Example 1) exhibits after cold storage at +2 to +4° C. for 5 days a drip loss of 0.5 wt %.

This corresponds to an additional increase in usable fresh meat of 2.5 wt %.

EXAMPLES 5 TO 44

In the following examples, in which pork escalope and pork goulash are used as fresh meat, the advantages according to the invention will be compared for various hydrocolloid types.

The other hydrocolloids employed were used in powder form with particle sizes of ≦0.1 mm and will also be called alternative hydrocolloids below:

Xanthan as an example of hydrocolloids which are obtained from micro-organisms

Examples of hydrocolloids from marine plants are:
agar
alginate
carrageenan

Examples of hydrocolloids from terrestrial plants are:
gum arabic
cellulose derivatives (e.g. carboxymethylcellulose)
guar meal
apple pectin
locust bean gum Finally, collagen, such as was already used in Examples 1 to 4, was again used for comparison purposes in some reference examples.

A test series for cold storage and a test series for frozen storage was carried out in each case.

During the cold storage the fresh meat products were stored in a refrigerator for 5 days at +2 to +4° C.

During the frozen storage tests the following conditions were observed:

Storage time: 30 days; temperature: −20 to −24° C. in the freezer. The deep-frozen samples were thawed gently in the refrigerator at +2 to +4° C.

The pork escalopes were dusted with the respective hydrocolloid powder in the amounts given in the table. In the case of the pork goulash the stated amount was added to the pieces of meat.

The test results for Examples 5 to 44 are summarised in Tables 1 to 8. All % figures are wt % figures referred to the fresh meat contents.

TABLE 1

| Pork escalope Cold storage test | | Fresh meat | | | |
|---|---|---|---|---|---|
| (5 days) | | Original | Final | Drip loss | |
| Example | Hydrocolloid | Weight | weight | g | % |
| A | Control | 253.4 | 247.2 | 6.2 | 2.5 |
| 5 | Xanthan 0.6% | 316.1 | 313.9 | 2.2 | 0.9 |
| 6 | Agar 0.6% | 323.8 | 320.9 | 2.9 | 0.9 |
| 7 | Carrageenan 0.6% | 351.7 | 348.9 | 2.8 | 0.8 |
| 8 | Guar meal 0.6% | 321.1 | 318.7 | 2.4 | 0.7 |
| 9 | Gum arabic 0.6% | 335.2 | 331.1 | 4.1 | 1.2 |
| 10 | Apple pectin 0.6% | 249.4 | 245.5 | 3.9 | 1.5 |

TABLE 2

| Pork goulash Cold storage test | | Fresh meat | | | |
|---|---|---|---|---|---|
| (5 days) | | Original | Final | Drip loss | |
| Example | Hydrocolloid | Weight | weight | g | % |
| B | Control | 326.7 | 320.9 | 5.8 | 1.8 |
| 11 | Xanthan 0.6% | 337.9 | 333.5 | 4.4 | 1.2 |
| 12 | Agar 0.6% | 353.0 | 350.8 | 2.2 | 0.6 |
| 13 | Carrageenan 0.6% | 340.6 | 337.3 | 3.3 | 0.9 |
| 14 | Guar meal 0.6% | 355.2 | 351.2 | 4.0 | 1.1 |
| 15 | Gum arabic 0.6% | 324.5 | 321.3 | 3.2 | 1.0 |
| 16 | Apple pectin 0.6% | 337.2 | 333.4 | 3.8 | 1.1 |

TABLE 3

| Pork escalope Frozen storage test | | Fresh meat | | | |
|---|---|---|---|---|---|
| (30 days) | | Original | Final | Drip loss | |
| Example | Hydrocolloid | Weight | weight | g | % |
| C | Control | 198.4 | 188.4 | 10.6 | 5.2 |
| 17 | Xanthan 0.6% | 314.9 | 309.9 | 5.0 | 1.6 |
| 18 | Agar 0.6% | 223.8 | 319.9 | 3.9 | 1.7 |
| 19 | Carrageenan 0.6% | 290.2 | 286.9 | 3.3 | 1.1 |
| 20 | Guar meal 0.6% | 311.7 | 309.5 | 2.2 | 0.7 |
| 21 | Gum arabic 0.6% | 262.8 | 256.9 | 5.9 | 2.2 |
| 22 | Apple pectin 0.6% | 221.7 | 214.9 | 6.8 | 2.2 |

TABLE 4

Pork goulash
Frozen storage test — Fresh meat
(30 days)

| Example | Hydrocolloid | | Original Weight | Final weight | Drip loss g | % |
|---|---|---|---|---|---|---|
| D | Control | | 269.7 | 260.1 | 9.6 | 3.6 |
| 23 | Xanthan | 0.6% | 343.6 | 340.9 | 2.7 | 0.8 |
| 24 | Agar | 0.6% | 340.6 | 337.5 | 3.1 | 0.9 |
| 25 | Carrageenan | 0.6% | 347.7 | 345.1 | 2.6 | 0.7 |
| 26 | Guar meal | 0.6% | 346.1 | 342.4 | 3.7 | 1.1 |
| 27 | Gum arabic | 0.6% | 355.4 | 353.1 | 2.3 | 0.6 |
| 28 | Apple pectin | 0.6% | 335.2 | 331.3 | 3.9 | 1.2 |

TABLE 5

Pork escalope
Cold storage test — Fresh meat
(5 days)

| Example | Hydrocolloid | Original Weight | Final weight | Drip loss g | % |
|---|---|---|---|---|---|
| E | Control | 213.2 | 207.6 | 5.6 | 2.7 |
| 29 | Reference 0.6% collagen | 163.3 | 162.8 | 0.5 | 0.3 |
| 30 | 0.6% alginate | 244.1 | 240.3 | 3.8 | 1.4 |
| 31 | 0.6% locust bean gum | 240.7 | 238.2 | 2.5 | 1.0 |
| 32 | 0.6% carboxymethyl-cellulose | 273.8 | 270.1 | 3.7 | 1.3 |

TABLE 6

Pork goulash
Frozen storage test — Fresh meat
(30 days)

| Example | Hydrocolloid | Original Weight | Final weight | Drip loss g | % |
|---|---|---|---|---|---|
| F | Control | 413.7 | 403.9 | 9.8 | 2.3 |
| 33 | Reference 0.6% collagen | 397.0 | 394.8 | 2.2 | 0.6 |
| 34 | 0.6% alginate | 389.3 | 383.7 | 5.6 | 1.4 |
| 35 | 0.6% locust bean gum | 359.5 | 356.3 | 3.2 | 0.8 |
| 36 | 0.6% carboxymethyl-cellulose | 332.6 | 329.2 | 3.4 | 1.0 |

TABLE 7

Pork escalope
Frozen storage test — Fresh meat
(30 days)

| Example | Hydrocolloid | Original Weight | Final weight | Drip loss g | % |
|---|---|---|---|---|---|
| G | Control | 270.9 | 264.9 | 6.3 | 2.3 |
| 37 | Reference 0.6% collagen | 251.0 | 249.9 | 1.1 | 0.4 |
| 38 | 0.6% alginate | 251.3 | 248.7 | 2.6 | 1.0 |
| 39 | 0.6% locust bean gum | 327.5 | 326.1 | 1.4 | 0.4 |
| 40 | 0.6% carboxymethyl-cellulose | 272.0 | 267.8 | 4.2 | 1.5 |

TABLE 8

Pork goulash
Frozen storage test — Fresh meat
(30 days)

| Example | Hydrocolloid | Original Weight | Final weight | Drip loss g | % |
|---|---|---|---|---|---|
| H | Control | 413.7 | 403.9 | 9.8 | 2.3 |
| 41 | Reference 0.6% collagen | 397.0 | 394.8 | 2.2 | 0.6 |
| 42 | 0.6% alginate | 389.3 | 383.7 | 5.6 | 1.4 |
| 43 | 0.6% locust bean gum | 359.5 | 356.3 | 3.2 | 0.8 |
| 44 | 0.6% carboxymethyl-cellulose | 332.6 | 329.2 | 3.4 | 1.0 |

It may be stated in conclusion that an approx. 35% higher effect in reducing the occurrence of drip loss is achieved with collagen as hydrocolloid in the cold storage tests than with the alternative hydrocolloids. This difference is observed both with the sliced product "pork escalope" and with the product in small pieces "pork goulash".

During the frozen storage tests, an approx. 25% better effect is obtained with collagen as hydrocolloid for the fresh meat product pork escalope, and an approx. 20% better effect for the pork goulash, than with the alternative hydrocolloids.

Moreover, in the case of the fresh meat products treated with the alternative hydrocolloids there arose the disadvantage that the meat surface assumed a dull appearance in some cases and in addition was slightly sticky, so that the positive effect of collagen as a hydrocolloid was not able to be fully achieved with the latter. Collagen is therefore to be described as the most preferred hydrocolloid.

The fresh meat used in Examples 1 to 44 was 3 days old at the time of use in the process according to the invention.

This treatment interval proved to be the most favourable in further tests, although earlier treatment is also possible without problems, albeit with a slightly reduced effect. After the expiry of 3 days from slaughter, significantly worse results are obtained for the treatment.

The invention claimed is:

1. Process for storing fresh meat consisting essentially of treating the surface of the fresh meat with 0.2 to 1.5 wt % of a solid hydrocolloid, based upon the weight of the meat, and thereafter storing the treated fresh meat at cold storage temperatures or in a frozen state, wherein the meat is mammalian meat and wherein the hydrocolloid is derived from animal collagen.

2. Process according to claim 1, wherein the meat is portioned prior to the treatment with the hydrocolloid.

3. Process according to claim 1, wherein the hydrocolloid is present in powder or granule form.

4. Process according to claim 3, wherein the hydrocolloid is used in spray-dried form.

5. Process according to claim 3, wherein the hydrocolloid has a mean particle size of less than 0.2 mm.

6. Process according to claim 1, wherein the meat is treated with 0.5 to 0.9 wt % of hydrocolloid, based on the weight of the meat.

7. Fresh meat treated with solid hydrocolloid according to claim 1.

8. Process for storing fresh meat consisting essentially of treating the surface of the fresh meat with 0.2 to 1.5 wt % of a solid hydrocolloid, based upon the weight of the meat, and thereafter storing the treated fresh meat at cold storage temperatures or in a frozen state, wherein the meat is poultry meat and wherein the hydrocolloid is derived from poultry collagen.

9. Process according to claim 8, wherein the meat is portioned prior to the treatment with the hydrocolloid.

10. Process according to claim 8, wherein the hydrocolloid is present in powder or granule form.

11. Process according to claim 10, wherein the hydrocolloid is used in spray-dried form.

12. Process according to claim 10, wherein the hydrocolloid has a mean particle size of less than 0.2 mm.

13. Process according to claim 8, wherein the meat is treated with 0.5 to 0.9 wt % of hydrocolloid, based on the weight of the meat.

14. Fresh meat treated with solid hydrocolloid according to claim 8.

15. Process for storing fresh meat consisting essentially of treating the surface of the fresh meat with 0.2 to 1.5 wt % of a solid hydrocolloid, based upon the weight of the meat, and thereafter storing the treated fresh meat at cold storage temperatures or in a frozen state, wherein the meat is fish flesh and wherein the hydrocolloid is derived from fish collagen.

16. Process according to claim 15, wherein the meat is portioned prior to the treatment with the hydrocolloid.

17. Process according to claim 15, wherein the hydrocolloid is present in powder or granule form.

18. Process according to claim 17, wherein the hydrocolloid is used in spray-dried form.

19. Process according to claim 17, wherein the hydrocolloid has a mean particle size of less than 0.2 mm.

20. Process according to claim 15, wherein the meat is treated with 0.5 to 0.9 wt % of hydrocolloid, based on the weight of the meat.

21. Fresh meat treated with solid hydrocolloid according to claim 15.

* * * * *